Dec. 19, 1933.　　　E. P. BORDEAUX　　　1,940,043
DUMPING TRUCK
Filed June 8, 1931　　　3 Sheets-Sheet 1
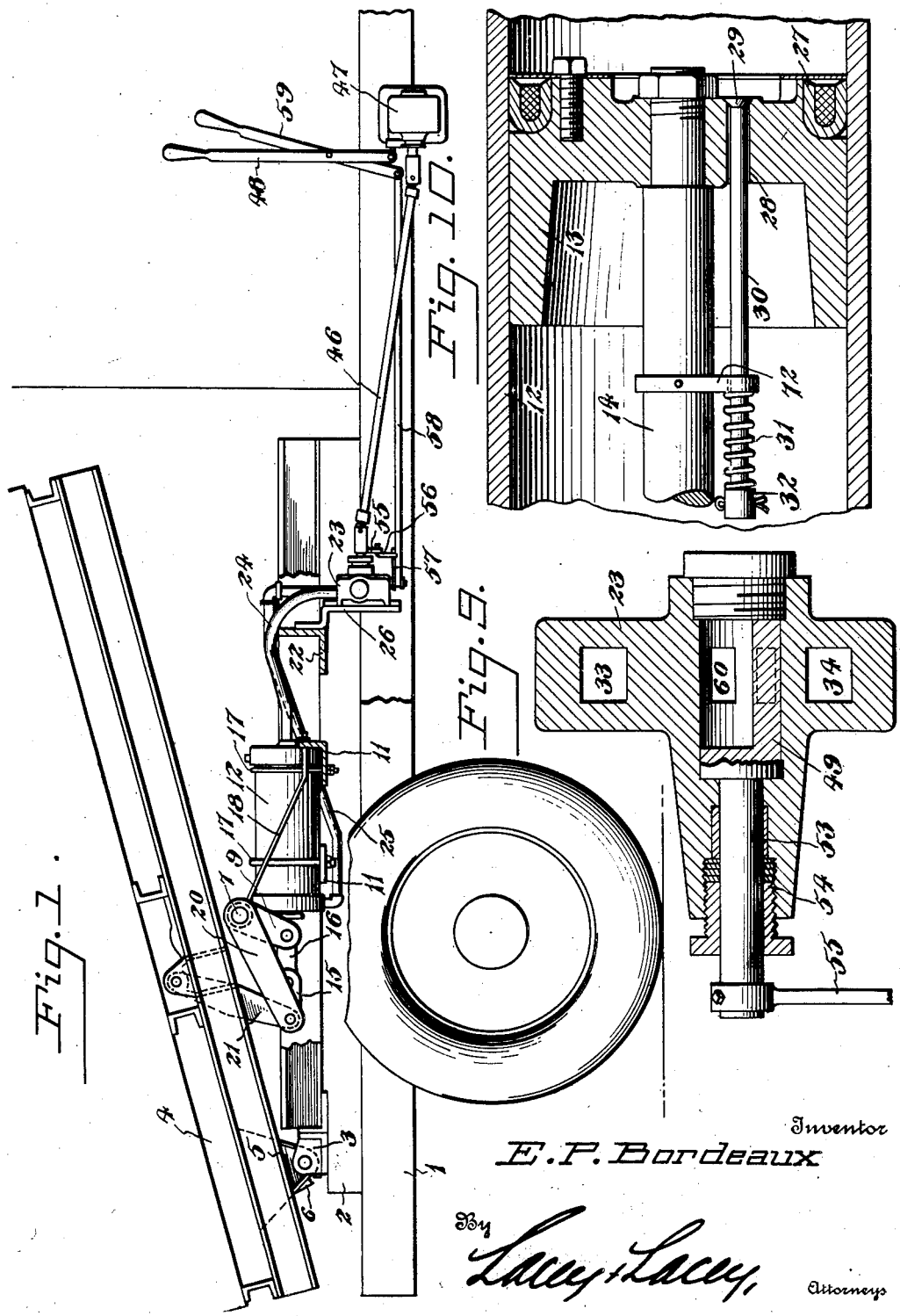
Inventor
E. P. Bordeaux
By Lacey & Lacey,
Attorneys Dec. 19, 1933.  E. P. BORDEAUX  1,940,043
DUMPING TRUCK
Filed June 8, 1931  3 Sheets-Sheet 2
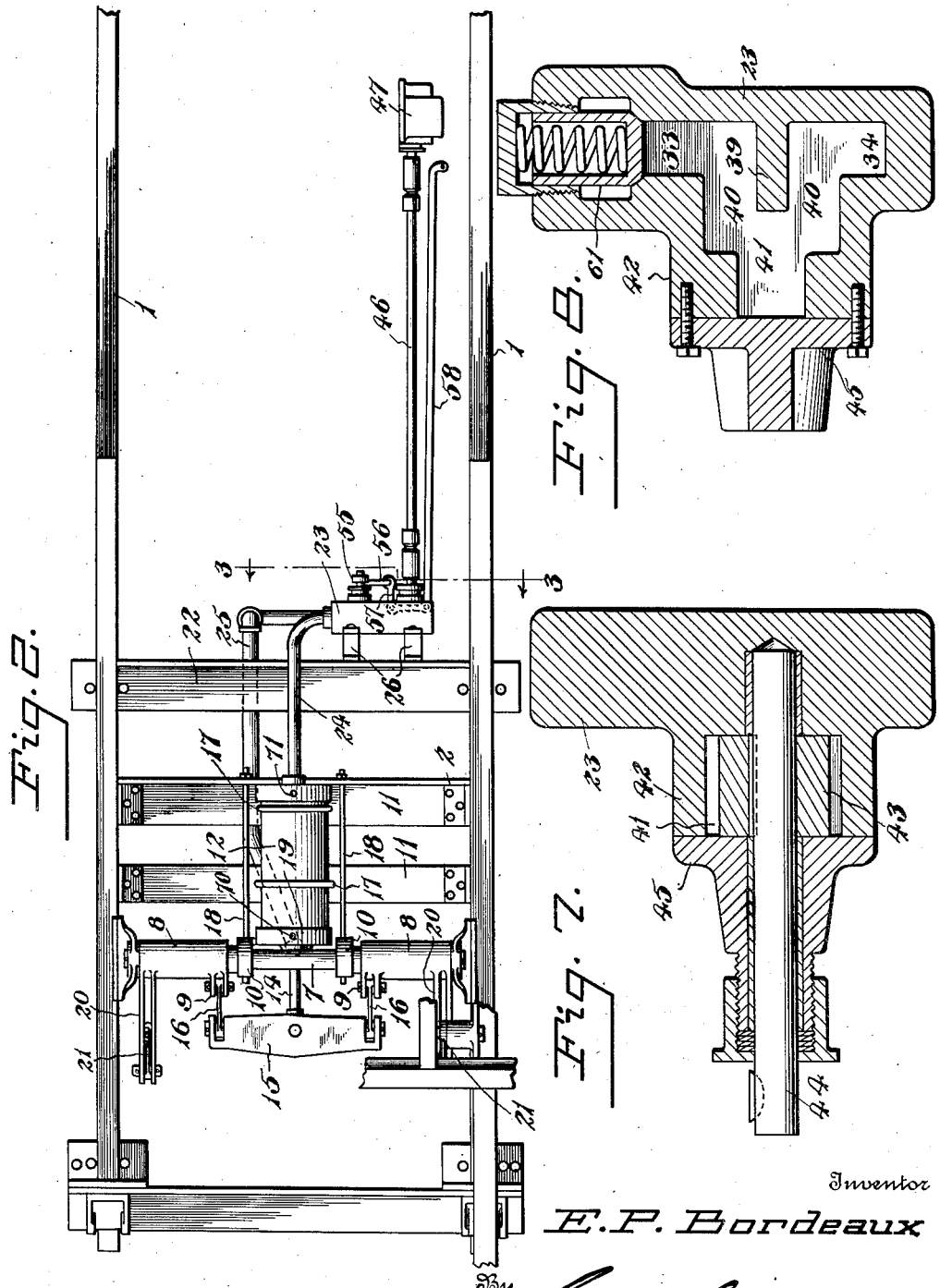
Inventor
E. P. Bordeaux
By Lacey & Lacey,
Attorneys

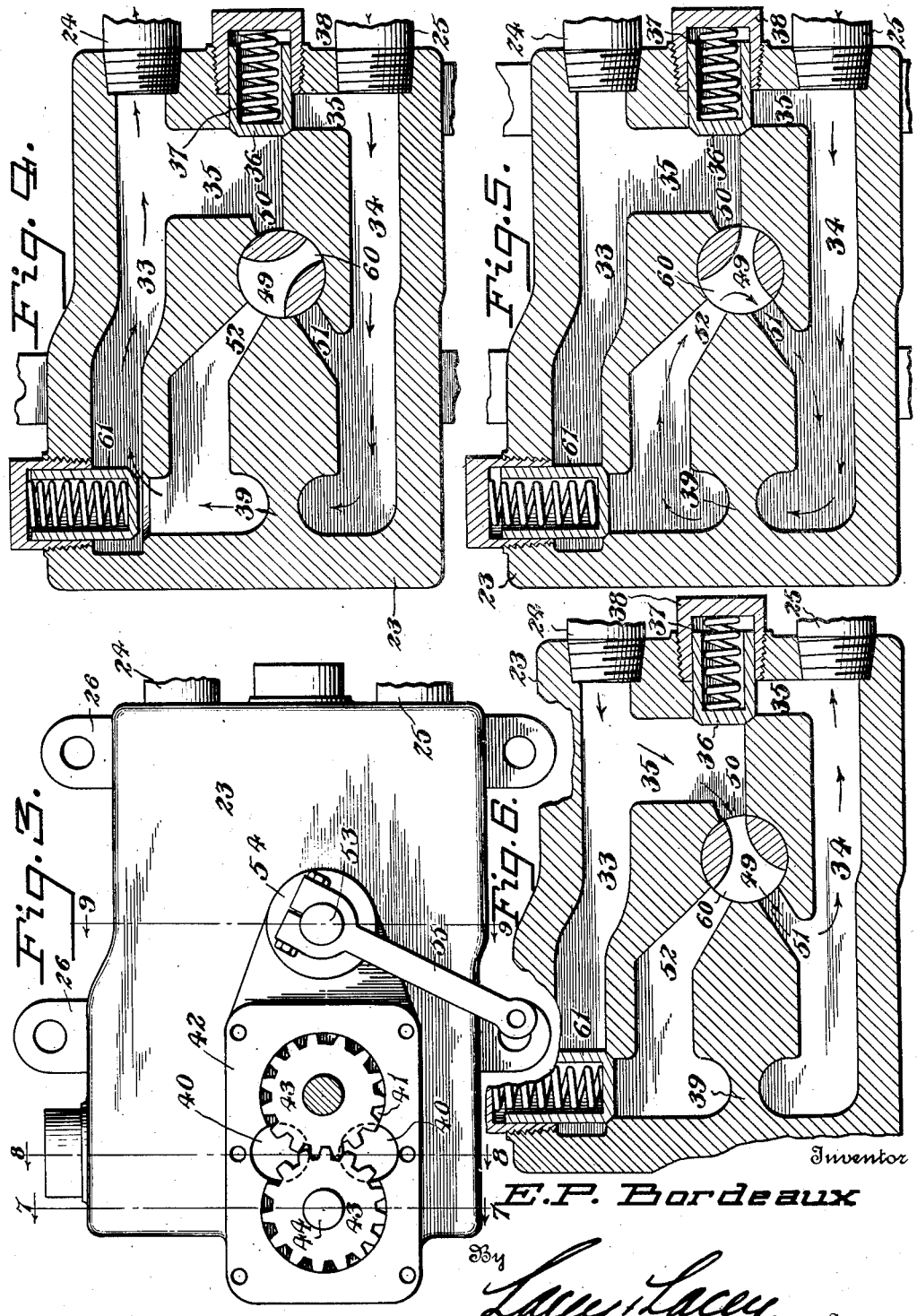

Patented Dec. 19, 1933

1,940,043

UNITED STATES PATENT OFFICE 1,940,043

DUMPING TRUCK

Ephriam P. Bordeaux, Galion, Ohio, assignor to Perfection Steel Body Company, Galion, Ohio, a corporation of Ohio Application June 8, 1931. Serial No. 542,917

2 Claims. (Cl. 138—9)

This invention relates to dumping trucks and has special reference to hydraulic means for tilting the truck body to dumping position and permitting its return to lowered or load-carrying position. The invention is illustrated in the accompanying drawings and will be hereinafter first fully described and then more particularly defined in the appended claims.

In the drawings,

Figure 1 is a side elevation, with parts broken away and in section, of so much of a dumping truck as is necessary to an understanding of the invention, Fig. 2 is a top plan view of the truck chassis and the operating mechanism, Fig. 3 is an enlarged section on the line 3—3 of Fig. 2, Figs. 4, 5 and 6 are sections through the pump or hydraulic motor, showing different positions of the controlling valve, Fig. 7 is a section on the line 7—7 of Fig. 3, Fig. 8 is a section on the line 8—8 of Fig. 3, Fig. 9 is a section on the line 9—9 of Fig. 3, and Fig. 10 is a diametrical section of the piston or plunger by which the tilting body is directly actuated.

In the drawings, the reference numeral 1 denotes the chassis sills of a motor vehicle, and the numeral 2 indicates a supplemental frame which is mounted on and carried by the chassis. At the rear end of the supplemental frame, fulcrum blocks 3 are provided which may be of any approved form, and the tilting body, a portion of which is indicated at 4, is provided with lugs 5 mating with the fulcrum blocks and pivoted thereto, as shown clearly in Fig. 1. A projection 6 is provided on the rear side of each lug 5 and is adapted to abut the mating fulcrum block 3 so as to limit the tilting movement of the dumping body and aid in maintaining the body in the tilted position. Disposed transversely of the supplemental frame and secured in suitable brackets provided therefor is a rod or stationary shaft 7, and upon said rod, at each end thereof, is mounted a hollow shaft 8 having a crank arm 9 at its inner end. Supported by hangers 10 which are suspended on the transverse rod 7 and by cross beams 11 of the supplemental frame is a cylinder 12 within which a plunger or piston 13 is mounted with a close running fit. A piston rod 14 extends from the piston through the rear head of the cylinder and has its rear extremity pivoted to a crosshead 15, as will be understood upon reference to Fig. 2. The opposite ends of the crosshead 15 are connected by links 16 with the respectively adjacent cranks 9, so that when the piston is moved rearwardly within the cylinder the crosshead will be likewise moved rearwardly and a rocking movement imparted to the hollow shafts 8 through the link and crank connections. The cross beams or bars 11 may be angle bars, as shown clearly in Fig. 1, and the front end or head of the cylinder rests in the angle of the front beam, the cylinder being rigidly held to the beams by U-bolts 17 passed around the cylinder and fastened in the beams, as will be understood. Tie rods 18 are disposed at the sides of the cylinder and have their ends secured in the front beam 11 and in the hangers 10 so that the cylinder will be firmly clamped between the beam and the hangers, and the rear head 19 of the cylinder may be integral with or rigidly secured to the hangers 10. It is to be understood, however, that the cylinder may be supported in any convenient manner which will provide the required rigidity. At the outer ends of the hollow shafts 8 are cranks 20 which are longer than the cranks 9 and are set at an angle thereto, as shown in Fig. 1. The rear ends of the cranks 20 are connected by links or lifting arms 21 with the sides of the tilting body, so that when the shafts 8 are rocked a tilting movement will be imparted to the body.

It will be seen from the foregoing description that, if the crosshead 15 be moved rearwardly, the shafts 8 will be rocked so that the crank arms 20 will be swung upwardly and the lifting arms or links 21 will acquire a corresponding movement so that the body 4 will be tilted about its hinged or pivotal connection with the rear end of the supplemental frame. The load carried by the body will be thereby discharged and, when the load has been discharged, the pressure upon the piston 13 is reduced or relieved so that the weight of the body may cause it to return to its lowered position, the crosshead and connected parts moving in a direction the reverse of that previously followed.

Supported by a transverse beam 22, which forms a part of the supplemental frame and is located in advance of the beam 11, is a pump block 23, from one end of which pipes 24 and 25 lead to the front and rear heads of the cylinder 12, respectively, and it is to be understood that said pipes, the several passages within the pump block, and the cylinder 12, are to be filled with liquid, such as oil, and the piston 13 will be moved rearwardly or forwardly accordingly as the oil or other liquid is caused to flow through one or the other of the pipes 24, 25. The pump block 23 may be supported from the beam 22 in any preferred manner, and I have shown hanger brackets 26 secured to the pump block and to the beam. It is also to be understood that while the pump block has been illustrated as having its longer dimension running horizontally, it may be set with its longer dimension extending vertically, according to the detailed construction of the particular truck to which the invention is to be applied.

To facilitate the filling of the system, the rear cylinder head is provided with a filling plug, indicated at 70, and the front head is provided with a vent plug, indicated at 71, to permit escape of air which would, otherwise, be trapped in some of the passages.

The piston 13 is provided at its front end with packing, indicated at 27, of any approved form, whereby leakage around the piston will be prevented, and through the piston is a port 28 normally closed by a valve 29 seating in its front end and having a stem 30 extending rearwardly through the passage and beyond the piston. An expansion spring 31 is coiled around the stem between an abutment or shoulder 32 on the stem and a guiding and supporting bracket 72, which is carried by the piston rod 14 and encircles the valve stem, so that the valve is held normally seated. The parts are so proportioned that when the tilting body 4 has been raised to a predetermined point at which the load will be most efficiently discharged, the end of the valve stem will impinge against the rear head of the cylinder and the valve will consequently be unseated, whereupon the pressure fluid may flow through the port or passage 28 and will not impart further rearward movement to the piston. The tilting body will consequently be held in the dumping position until the load has been discharged.

The pump block 23 is provided with passages 33 and 34 which extend substantially longitudinally of the block and communicate directly with the pipes 24 and 25, respectively, as shown clearly in Figs. 4, 5 and 6. The pump block is also provided with a transverse passage 35 which serves to connect the passages 33 and 34, and mounted in an end of the block, between the pipes 24 and 25, is a relief valve which will act automatically to effect a reduction of pressure in the event that the motor of the truck is overspeeded or the body is jolted while in a tilted position. This relief valve may be of any preferred construction but is shown as comprising a sleeve or open-ended cylinder 36 which, at its closed inner end, may seat upon a wall of the passage 35 between the ends of said passage and is normally held to said seat by an expansion spring 37 housed within the sleeve and bearing at one end upon the closed end of the sleeve and, at its opposite end, upon a hollow plug 38 which is threaded into the end of the pump block and fits around the open end of the sleeve, as shown clearly in Figs. 4, 5 and 6, to support and guide the sleeve in its occasional movements. When the valve is seated, direct flow between the passages 33 and 34 will be prevented, but when the valve is unseated, the liquid may circulate within the pump block without flowing through the pipes 24 and 25. The passages 33 and 34 extend to the end of the block opposite the relief valve 36 and then extend toward each other to terminate at opposite sides of a web 39 projecting from the end of the block. Side or branch passages 40 then lead from the passages 33 and 34 to the pumping chamber 41, which is formed in an offset 42 of the pump block and houses pumping spur gears 43 which intermesh at a point in lateral relation to the branch passages 40 and in a plane bisecting said passages. This spur gear pump is a well-known device and acts in a well-known manner to effect circulation of the liquid within the pump chamber and through the system. One of the gears 43 has its shaft 44 extended through the cap plate 45 which covers the pumping chamber, and its forward end is coupled to a driving shaft 46 which is connected with a power take-off device 47 arranged near the motor plant of the truck, a hand lever 48 being provided adjacent the operator's seat whereby the clutch of the power take-off may be shifted to cause the take-off to be actuated by the engine of the truck or disengaged therefrom, accordingly as the tilting body is to be raised or lowered.

A three-way rotary controlling valve 49 is mounted in the pump block and is located at the junction of a port 50 formed in one side of the passage 35, a port or passage 51 extending from the longitudinal passage 34 in the pump block, and a branch passage 52 leading from the lateral end branch of the passage 33. This controlling valve has a stem 53 projecting forwardly through the pump block and a packing box 54 provided thereon, and, at its front end, is provided with a crank 55. From the lower end of the crank 55, a link 56 extends to one arm of an angle lever or bell crank 57 which is fulcrumed upon the pump block and has its opposite end pivoted to a connecting rod 58 which extends forwardly and is connected at its front end to a hand lever 59 whereby the valve may be set in a desired position. The valve is a body or plug of circular cross section, provided with a passage 60 extending substantially diametrically of the plug or body and having one end flared, as clearly shown in Figs. 4, 5 and 6.

There is also provided a check valve 61 at the end of the passage 33 remote from the pipe 24 and, at the junction of said passage with the lateral branch thereof, this check valve 61 being, preferably, of the same detail construction as the relief valve 36. The check valve 61 will permit flow from the pump chamber to the pipe 24 but will prevent back flow from the pipe to the pump chamber.

The gear pump may operate always in the same direction and it may be set to drive clockwise or counter-clockwise as desired. The action of the pump is controlled by setting the controlling valve in the proper position. When the tilting body 4 is to be raised, the controlling valve is set in the position shown in Fig. 4, in which all of the ports 50, 51 and 52 will be closed or blocked by the valve, and then the liquid will be caused to flow in the direction indicated by the arrows in Fig. 4 so that it will pass out through the pipe 24 into the front or high pressure end of the cylinder 12 and drive the piston 13 rearwardly, the travel of the piston causing the several crank and link connections to be actuated as heretofore described and lift the tilting body 4. When the piston reaches the predetermined limit of its rearward movement, the valve 29 will be unseated or opened, as previously stated, whereupon the pressure exerted by the oil or other liquid on the piston will be reduced and the piston will come to rest. The oil which then enters the cylinder will flow through the port 28 in the piston and return to the pump through the pipe 25. If the controlling valve be set in the position shown in Fig. 5, the port 50 will be blocked, while the ports 51 and 52 will be put in communication, and the liquid which returns from the low pressure side of the cylinder through the pipe 25 to the pump will not then flow to the pipe 24 but will be simply circulated through the ports 51 and 52, as indicated by the arrows in Fig. 5, so that the liquid within the cylinder will remain in a state of quietude. If the controlling valve be set in the position shown in Fig. 6, the ports 50, 51 and 52 will be in communication and the weight of the tilting body may then act to lower the same through the force of gravity, the liquid in advance of the piston returning through the pipe 24 to the pump casing and then passing through the valve 49 to the passage 34, and thence into the pipe 25, as indicated by the arrows in Fig. 6.

It will thus be seen that I have provided an exceedingly simple, compact and easily controlled mechanism whereby the tilting body of a dumping truck may be raised by fluid pressure, held in the raised position as may be desired, and then lowered.

Having thus described the invention, I claim:

1. In apparatus for the purpose set forth, a cylinder, a piston therein, a pump block having longitudinal passages, a cross passage connecting the longitudinal passages near one end of the block, and a plurality of branch passages in communication with said longitudinal and cross passages between the ends thereof, a three-way rotary controlling valve common to all the branch passages, pipes extending from one end of the block to connect the respective longitudinal passages with the opposite ends of the cylinder, a pump at the opposite end of the block between and in communication with the longitudinal passages, a spring pressed telescopic relief valve seating across the cross passage, and a spring pressed telescopic check valve at the opposite end of the block between the pump and the longitudinal passage connected with the high pressure side of the cylinder and preventing flow from said passage to the pump.

2. In an apparatus for the purpose set forth, a cylinder, a piston thereon, a pump, passages connecting the high pressure end of the cylinder with the outlet of the pump and the low pressure end of the cylinder with the inlet of the pump respectively, a check valve between the pump outlet and the high pressure end of the cylinder in the passage leading to said end of the cylinder and opening to permit flow from the pump to the cylinder, a cross passage connecting the passages leading to and from the pump, a pressure relief valve in the cross passage, a valve seat at the side of said cross passage opposite the pressure relief valve and connected with said passage, branch passages leading to said valve seat from the passages connected with the high and low pressure ends of the cylinder respectively, the branch passage leading to the high pressure passage being connected with said high pressure passage between the pump and the check valve, and a three-way valve in said valve seat controlling the several passages.

EPHRIAM P. BORDEAUX.